United States Patent [19]

Schenken et al.

[11] Patent Number: 5,418,518

[45] Date of Patent: May 23, 1995

[54] ANIMAL WARNING DEVICE

[75] Inventors: John Schenken; Charles A. Haas, both of Des Moines; Jerome Hartmann, Carlisle, all of Iowa; Roy M. Johnson, Highlandville, Mo.; C. Austin Greider; Alvadore J. Osborn, both of Des Moines, Iowa

[73] Assignee: Cobbs Manufacturing Company, Des Moines, Iowa

[21] Appl. No.: 123,687

[22] Filed: Sep. 20, 1993

[51] Int. Cl.⁶ .................................................. G08B 3/00
[52] U.S. Cl. ............................. 340/384.1; 340/384.2; 340/573; 116/22 A; 367/139
[58] Field of Search .............. 340/384.1, 384.2, 384.6, 340/384.72, 425.5, 565, 573; 116/22 A, 28 R, 62.3, 137 R; 367/139

[56] References Cited

U.S. PATENT DOCUMENTS

| | | | |
|---|---|---|---|
| D. 344,319 | 2/1994 | Lin | D22/120 |
| 4,150,637 | 4/1979 | Penick | 116/28 R |
| 4,437,428 | 3/1984 | Hoffelner | 116/137 R |
| 4,903,630 | 2/1990 | Rezmer | 116/22 A |
| 4,998,091 | 3/1991 | Rezmer | 340/384 E |
| 5,214,411 | 5/1993 | Herbruck | 340/573 |
| 5,278,537 | 1/1994 | Carlo et al. | 340/384.1 |

*Primary Examiner*—John K. Peng
*Assistant Examiner*—Nina Tong
*Attorney, Agent, or Firm*—Dick and Harris

[57] ABSTRACT

An animal warning device for alerting, and in turn warning, various animals, such as deer, through one or more tones audible to animals, that a vehicle, to which the device may be attached, is approaching. A housing member, which supports a speaker, is adjustably attachable to a vehicle. The housing member includes a dispersing region operatively associated with the housing member for dispersing the one or more tones broadcasted out of the speaker in a radiated, spray-like pattern.

16 Claims, 1 Drawing Sheet

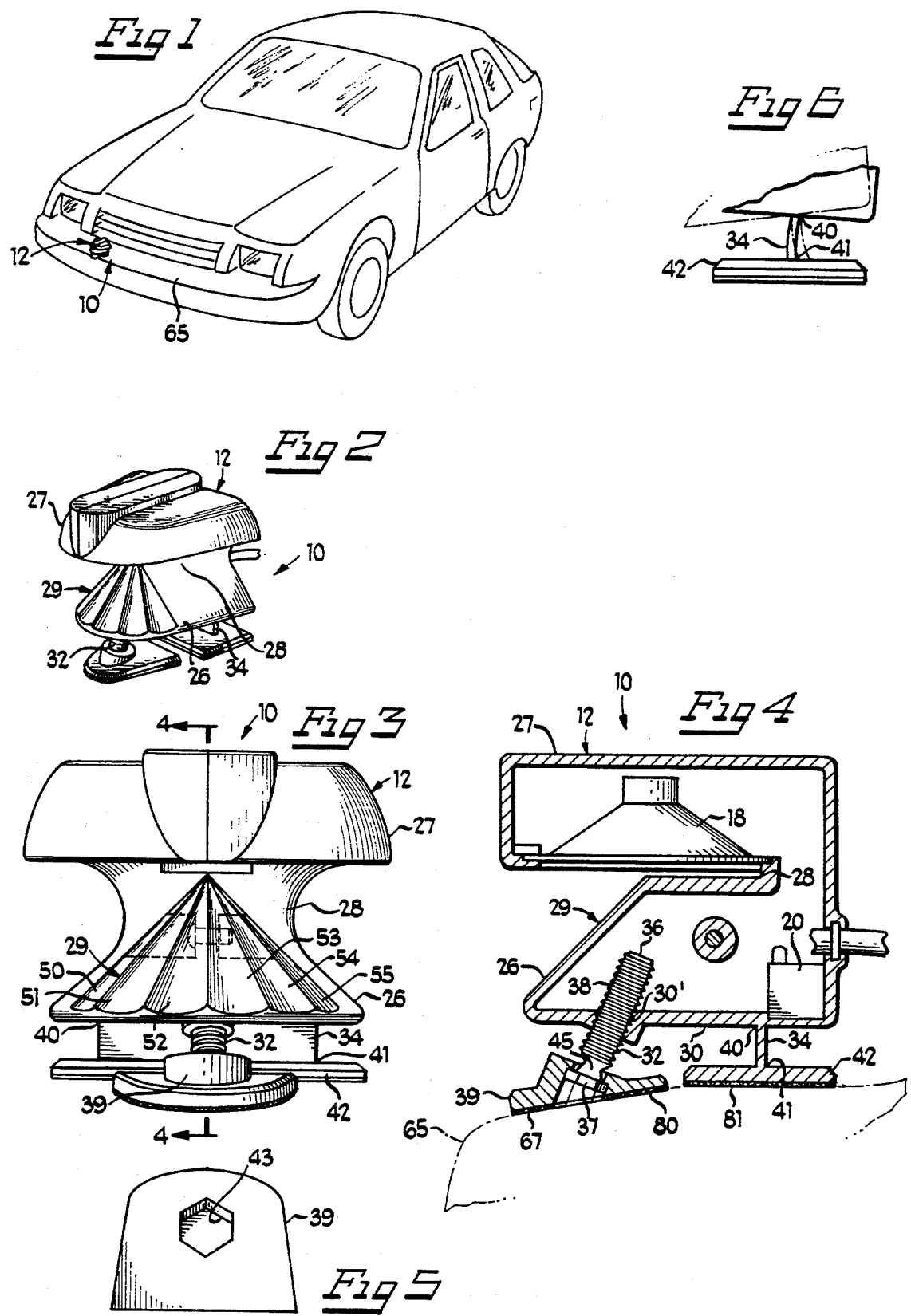

ANIMAL WARNING DEVICE

BACKGROUND OF THE INVENTION

1. Field of the Invention

The present invention relates in general to animal whistles, and, in particular, to an animal warning device for alerting, and in turn warning, various animals, such as deer, that a vehicle to which the device may be attached, is approaching.

2. Background Art

Animal whistles, and more particularly animal whistles for attachment to vehicles, such as automobiles, for alerting animals that the vehicle is approaching, have been known in the art for several years. Typically, such prior art animal whistles have generated an ultrasonic frequency through the creation of subatmospheric pressure within the device—wherein the subatmospheric pressure results from wind being blown into the device. Accordingly, the subatmospheric pressure excites a pipe within the path of travel of the wind to, in turn, vibrate the pipe which then creates an ultrasonic tone. The tone then emerges from a horn section and is then deflected off of a portion of the neck of the whistle in a direction toward the line of travel of the vehicle to which the device is attached. An example of such prior art can be found in Hoffelner, U.S. Pat. No. 4,437,428.

Although such prior art animal whistles have been found to be somewhat effective, with respect to alerting animals directly in the line of travel of the vehicle to which the device is attached, such prior art devices have failed to teach, much less disclose, dispersing the generated tones in a radiated, spray-like pattern so as to alert animals along the sides of the road, and, in turn, off to the side of the vehicle, as well. Indeed, although the prior art does disclose means for adjusting the direction of the broadcasted tones, such as shown in Rezmer, U.S. Pat. No. 4,903,630, the generated tones are not contemplated to be simultaneously broadcasted in the direction of the line of travel of the vehicle and the sides of the vehicle from a single broadcasting position.

SUMMARY OF THE INVENTION

An animal warning device for alerting, and, in turn warning, various animals, such as deer, through one or more tones audible to such animals, that a vehicle, to which the device may be attached, is approaching. The device includes means for broadcasting the one or more tones, as well as means for housing the broadcasting means. The housing means has a base section operatively attachable to an external surface of the vehicle. In addition, the device also comprises means for dispersing each of the one or more tones as they are broadcasted from the speaker in a radiated, spray-like pattern. The dispersing means are operatively associated with at least a portion of the housing means.

In the preferred embodiment of the invention, the housing means further includes an upper section, and, a neck section extending between the base section and the upper section. The broadcasting means, which may comprise a speaker, is operatively attached to one of the base section or the upper section and positioned proximate to the neck section. The dispersing means comprises one or more facet-like segments which are operatively formed on at least the other of the upper section or base section from the base section or upper section on which the broadcasting means is operatively attached.

In one preferred embodiment, the broadcasting means are operatively attached to the upper section and the dispersing means are operatively formed on the base portion. In addition, each of the facet-like segments, which comprise the dispersing means, may have a substantially concave configuration wherein each of the facet-like segments are operatively positioned adjacent to at least one other of the facet-like segments.

In the preferred embodiment of the invention, the animal warning device further comprises means for leveling the housing means with respect to the external surface to which it is to be attached. In this preferred embodiment, the base section of the housing means has a bottom surface, a front leg member having one or more foot-like members, and at least one rear leg member having one or more foot-like members. Each of the front and rear leg members have a top end operatively attached to the bottom surface of the base section and a bottom end operatively attached to a respective one or more of the foot-like members.

The leveling means comprise at least a portion of the front leg member and an associated portion of the base section each being threaded so as to enable threaded cooperation therebetween, to, in turn, adjustably alter the distance between the one or more foot-like members and the bottom surface of the base section. In addition, the bottom end of the front leg member may be pivotally attached to the corresponding foot-like member.

In another preferred embodiment, the housing means further includes means for absorbing shock indirectly imparted thereto. The shock absorbing means is integrally formed with at least one of the rear leg members.

The housing means further includes attachment means for operatively securing the housing means to an external surface. Such attachment means may comprise adhesive tape operatively attached to at least a portion of one or both of the front and rear foot-like members.

BRIEF DESCRIPTION OF THE DRAWINGS

For a better understanding of the present invention, reference may be had to the accompanying drawings in which:

FIG. 1 is a perspective view of an embodiment of the present invention as attached to an automobile for operative use therewith;

FIG. 2 is an elevated perspective view of the embodiment of the present invention;

FIG. 3 is a front elevational view of the present invention, showing, in particular, the facet-like segments of the dispersing means and the front and rear leg members attached to the housing means;

FIG. 4 is a cross-sectional view of the present invention, taken generally along lines 4—4 of FIG. 3 and looking in the direction of the arrows, showing, in particular, the positioning of the speaker within the housing means, as well as the threaded engagement between the front leg member and the housing means;

FIG. 5 of the drawings is a fragmentary bottom view of the front foot-like member, showing in particular, the female hexagonal region thereof; and FIG. 6 is a fragmentary view of the rear leg member attached to a portion of the housing means.

DETAILED DESCRIPTION OF THE DRAWINGS

While this invention is susceptible of embodiment in many different forms, there is shown in the drawings and will herein be described in detail, one specific embodiment with the understanding that the present disclosure is to be considered as an exemplification of the principles of the invention and is not intended to limit the invention to the embodiment illustrated.

Animal warning device 10 is shown in FIGS. 2 and 3 as including housing means 12, speaker 18 (FIG. 4), tone dispersing means 29, front leg member 32 and rear leg member 34. Housing means 12 is shown in FIG. 2 through FIG. 4 as including base section 26, upper section 27, neck section 28, bottom surface 30 (FIG. 4) and threaded region 30' (FIG. 4) of the bottom surface. Front leg member 32, as shown in FIG. 4, comprises a shaft portion having a top end 36, a bottom end 37, a threaded region 38 and a pivot region 45. As will be explained in greater detail, bottom end 37, which is operatively positioned within front foot-like member 39 (FIG. 5), has a hexagonal configuration for operable cooperation with female hexagonal portion 43 (FIG. 5) of foot-like member 39.

Rear leg member 34 is shown in detail in FIGS. 3, 4 and 6, as including top end 40 and bottom end 41. Top end 40 is operatively attached to a portion of bottom surface 30 (FIG. 4) of housing means 12, and bottom end 41 is operatively attached to rear foot-like member 42. As shown in FIG. 4, rear leg member 34 may be constructed to have a relatively thin transverse cross-sectional dimension compared to that of front leg member 32. In addition, it is preferred that the rear leg member be fabricated from a material possessing ridged, yet resilient properties, such as polypropylene to, in turn, result in a rear foot-like member having shock absorbing means integrally formed therewith. Accordingly, when a shock, (such as the shock typically imparted to an automobile as it is being driven over a road) is imparted to housing means 12, rear leg member 34 will serve as a shock absorbing means to, in turn, reduce the likelihood of damage which may otherwise result to housing means 12. In addition, as shown in FIG. 4, front foot-like member 39 and rear foot-like member 42 both include attachment means 80 and 81, respectively, for securing the feet-like members, and accordingly, housing means 12, to an external surface.

Dispersing means 29 is shown in FIG. 2 and FIG. 3 as including a plurality of facet-like segments 50 through 55 (FIG. 3). Each of these segments may be configured to have a slightly concave surface. Furthermore, as shown in FIG. 4, speaker 18 is operatively positioned adjacent dispersing means 29 so that the tones broadcasted out of the speaker will be directed toward, and into contact with each of the facet-like segments 50-5-5—wherein such tones will then be dispersed in a radiated, spray-like, pattern. Accordingly, when animal warning device 10 is attached to a vehicle, such as an automobile (FIG. 1), the tones will not only be dispersed in a direction in front of the automobile, but they will be dispersed in a direction away from the sides of the automobile as well—to, in turn, alarm and scare animals out of the line of travel of the automobile, as well as to alarm and scare animals which may be off to the sides of the road—so as to reduce the likelihood of a collision between the oncoming automobile and such animals. It is contemplated that the tones broadcasted out of the speaker comprise tones which are audible to animals, such as ultrasonic tones, as well as those which may be audible to humans as well. The means for generating such tones can be accomplished through any conventional circuitry of the type generating single and/or multiple frequencies such as can be made using Integrated Circuits 2N 3704, 2N 3906, MC 4013B and others from Motorola, National Semiconductor and others.

Operable positioning of housing means 12 on an external surface of a vehicle, such as an automobile bumper 65 (as shown in FIGS. 1 and 4) can be effectuated by placing housing means 12 in a desired location (preferably in an unobstructed location wherein at least a portion of facet-like segments 50–55 will be facing toward the line of travel of the vehicle to which housing means 12 is attached) and then adjusting housing means 12 until it is in a substantially level position, as shown in FIG. 4. Such leveling is accomplished by manipulating front foot-like member 39 up toward top end 36 of the shaft of front leg member 32 until female hexagonal portion 43 (FIG. 5) of the foot-like member engages with bottom hexagonal end 37 of the leg member. Accordingly, when such engagement occurs, foot-like member 39 can function like a wrench, to, in turn, facilitate rotation of front leg member 32.

Inasmuch as top end 36 of the shaft of front leg member 32 is threadably engaged with bottom surface 30 of housing means 12, such rotation of front leg member 32 will serve to alter the distance between bottom surface 30 of housing means 12, and bottom end 37 of the shaft of the leg member, to, in turn, facilitate leveling of housing means 12. Furthermore, once properly leveled, pivot region 45 of front leg member 32 will enable foot-like member 39 to pivot with respect to the leg member. Accordingly, bottom side 67 of foot-like member 39 can be attached to an otherwise angled surface, with respect to the surface to which rear foot-like member 42 is attached.

After proper leveling of housing means 12 has been achieved, the housing means can be secured to the external surface by attachment means (such as "double sided adhesive tape") 80 and 81 (FIG. 4) which may be operatively applied to the bottom sides of the front and rear foot-like members. Although double sided adhesive tape is preferred for such attachment means, other types of conventional attachment means, such as clips, nuts, bolts, clamps and wire ties among others, are also contemplated for use.

The foregoing description and drawings merely explain and illustrate the invention and the invention is not limited thereto except insofar as the appended claims are so limited as those skilled in the art who have the disclosure before them will be able to make modifications and variations therein without departing from the scope of the invention.

What is claimed is:

1. An animal warning device for alerting animals while a vehicle is in proximity of the animals through one or more audible tones wherein said device is attached to said vehicle, said animal warning device comprising:

means for broadcasting said one or more tones;
means for housing said broadcasting means;
wherein said housing means includes a base section attachable to an external surface of the vehicle; and
means for dispersing each of said one or more tones from said broadcasting means in a radiated, spray-like pattern,
wherein said dispersing means is associated with at least a portion of said housing means;
wherein said housing means further comprises an upper section and a neck section which is extending between said base section and said upper section;

wherein said broadcasting means is attached to said upper section;

and said dispersing means comprises at least one facet-like segments formed on at least the base section.

2. The invention according to claim 1, wherein each of said one or more facet-like segments has a concave configuration.

3. The invention according to claim 1, wherein said facet-like segments comprise two facet-like segments.

4. The invention according to claim 1 wherein said animal warning device further comprises means for leveling said housing means with respect to the external surface to which it is to be attached.

5. The invention according to claim 4 wherein said base section of said housing means has a bottom surface, said base section comprises a front leg member having at least one foot-like member, and at least one rear leg member having at least one foot-like member, each of said front and rear leg members having a top end attached to said bottom surface of said base section and a bottom end operatively attached to a respective said at least one foot-like member.

6. The invention according to claim 5 wherein said leveling means comprises means for adjusting the distance between the at least one foot-like member of said front leg member and the bottom surface of the base section by threading at least a portion of said front leg member and an associated portion of said base section therebetween.

7. The invention according to claim 5 wherein said bottom end of said front leg member is pivotally attached to said at least one foot-like member of said front leg member.

8. The invention according to claim 5 wherein said housing means further comprises means for absorbing shock imparted to said housing means, said shock absorbing means being integrally formed with said at least one rear leg member.

9. The invention according to claim 5 wherein said housing means further comprises attachment means for securing said housing means to said external surface.

10. The invention according to claim 9 wherein said attachment means comprises adhesive tape attached to at least a portion of said at least one foot-like member of said front and rear foot-like members.

11. The invention according to claim 1 wherein said broadcasting means includes a speaker.

12. An animal warning device for alerting animals while a vehicle is in proximity of the animals through one or more audible tones wherein said device is attached to said vehicle said animal warning device comprising:

means for broadcasting said one or more tones;

means for housing said broadcasting means;

wherein said housing means includes a base section attachable to an external surface; and means for leveling said housing means with respect to the external surface to which it is to be attached, wherein said base section of said housing means has a bottom surface, said base section comprises a front leg member having at least one foot-like member, and at least one rear leg member having at least one foot-like member, each of said front and rear leg members having a top end attached to said bottom surface of said base section, and a bottom end operatively attached to a respective said at least one foot-like member.

13. The invention according to claim 12 wherein said leveling means comprises means for adjusting the distance between the at least one foot-like member of said front leg member and the bottom surface of the base section by threading at least a portion of said front leg member and an associated portion of said base section therebetween.

14. The invention according to claim 12 wherein said bottom end of said front leg member is pivotally attached to said at least one foot-like member of said front leg member.

15. The invention according to claim 12 wherein said housing means further comprises means for absorbing shock imparted to said housing means, said shock absorbing means being integrally formed with said at least one rear leg member.

16. The invention according to claim 12 wherein said housing means further comprises attachment means for securing said housing means to said external surface.

* * * * *